Aug. 3, 1965 N. M. PAPANICOLAOU 3,199,102
FM DOPPLER RADAR NAVIGATION SYSTEM
Filed June 12, 1961 2 Sheets-Sheet 2
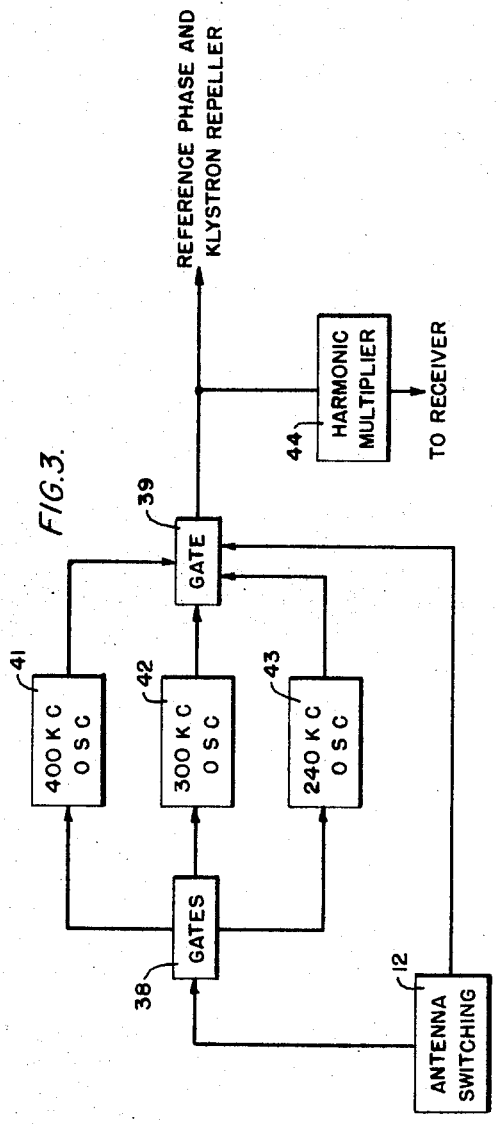
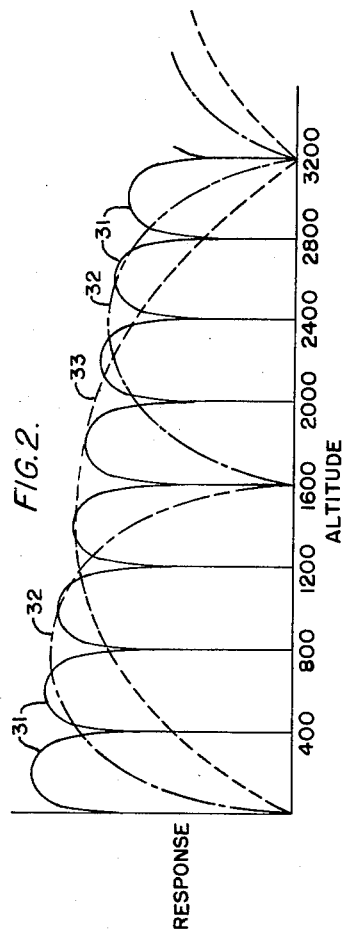
INVENTOR.
NICHOLAS M. PAPANICOLAOU
BY
Killman, Smith & Lamb

United States Patent Office 3,199,102
Patented Aug. 3, 1965

3,199,102
FM DOPPLER RADAR NAVIGATION SYSTEM
Nicholas M. Papanicolaou, Baltimore, Md., assignor to The Bendix Corporation, Towson, Md., a corporation of Delaware
Filed June 12, 1961, Ser. No. 116,440
10 Claims. (Cl. 343—8)

This invention relates generally to frequency modulated radar systems and has particular application to FM-CW Doppler navigation systems in which microwave energy is projected toward the ground and return signal energy is recovered to obtain Doppler data from which navigational information can be derived.

One form of Doppler navigation system which employs frequency modulated transmitted energy is disclosed and claimed in the copending application of Gunkel et al., S.N. 845,034, assigned to the assignee of the present invention. The Doppler navigation system disclosed therein provides for the sequential positioning of an antenna beam at symmetrical positions relative to the aircraft horizontal axis to the right and left and fore and aft of the aircraft. The Doppler data recovered from each of these beam positions is processed to obtain the navigational indications required by the system. The present invention will be described as an improvement of the system in the co-pending Gunkel et al. application but it will be apparent that the improvements provided by the present invention are generally applicable to frequency modulated radar systems of various types.

In any frequency modulated continuous wave (FM-CW) radar system a phenomenon producing a null signal at the receiving antenna is encountered whenever the distance of the reflecting object from the radar antenna is equal to an integral multiple of the wave length of the modulation frequency. In aircraft navigation systems this phenomenon has been termed "altitude holes" and the loss of signal is generally so severe that the system experiences considerable error if the aircraft flies at an altitude where an altitude hole makes loss of data occur. For extremely accurate navigation the altitude holes which occur during climb and descent are also objectionable. In the aforementioned co-pending application the problem of altitude holes is minimized by stepping the modulation frequency over a pre-determined range according to a fixed program in order that over any period of time the altitude at which a hole occurs will be shifted slightly and the data received will be usable except for severe conditions. The stepping of the modulation frequency has disadvantages however, since the effect of a 3% change in the modulation frequency at higher altitudes tends to make the altitude response pattern overlap, while for the very lowest altitude the altitude hole is not completely eliminated and the difficulty still exists.

In order to overcome the disadvantages of a single modulation frequency which is stepped to vary a few percent from its nominal value, the present invention provides multiple modulation of the transmitted energy and recovers the echo signals in a manner to utilize all of the modulation frequencies employed for the virtual elimination of all altitude hole effects. This modulation is accomplished in a manner which permits the receiver as used in existing systems to be utilized with substantially no changes. An integral relationship is maintained between the modulation frequencies so that harmonics of the modulation frequency fall within the receiver intermediate frequency amplifier pass band. In order that the amplification can be carried out at the IF frequency a different term of the Bessel function expansion, which defines the energy distribution in any FM system, is recovered from each modulation frequency. Since the additional modulation present on the transmitter tends to broaden the transmitted spectrum and thus introduce some loss of sensitivity, the system in accordance with the present invention is arranged to terminate the multiple modulation after a predetermined altitude or predetermined signal level is reached at which time multiple modulation is no longer required and step variation of a single modulation frequency is adequate to eliminate altitude hole effects.

It is accordingly a primary object of the present invention to provide an improved radar system having multiple modulation in a FM-CW higher order harmonic receiver to eliminate loss of signal for reflecting objects at predetermined distances from the radar system.

A further object of the invention is to provide a simultaneous multiple modulation arrangement which is capable of multiple modulation of a transmitter without the introduction of beat frequency components which would further degrade the operation of the system.

Another object of the invention is to provide a sequential modulation system in which the modulation frequencies need not be harmonically related but are so chosen that an appropriate term of the Bessell function expansion for the radiated energy can be chosen for amplification in a common IF amplifier at a fixed frequency.

A further object of the invention is to provide in a simultaneous multiple modulation system arrangements for automatically removing the multiple modulation as a function of either altitude or received signal strength.

Another object is to provide a combined Wobbulated FM and multiple modulation frequency FM system of improved characteristics.

These and other objects of the invention will be apparent from the following detailed description taken in conjunction with the accompanying drawings wherein:

FIG. 2 is a diagram useful in explaining the operation of the system of FIG. 1;

FIG. 3 is a block diagram of a portion of a Doppler navigation system arranged to employ multiple sequential modulation frequencies.

Figure 1:
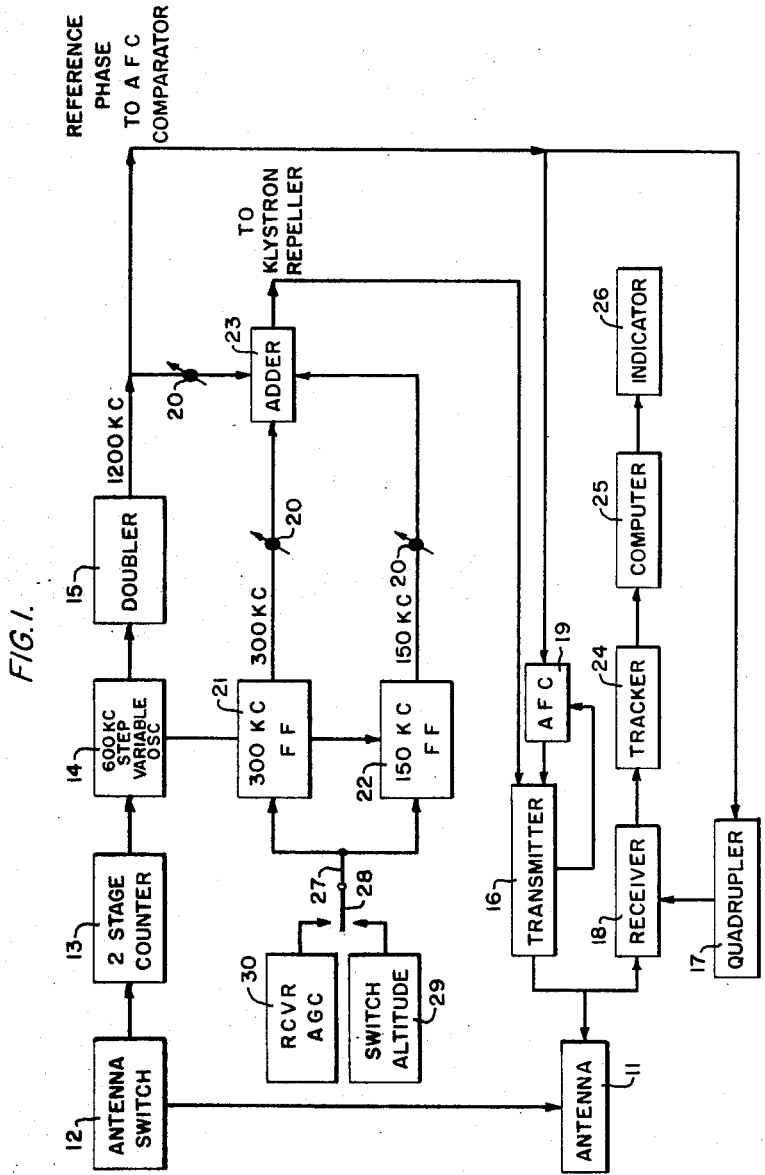
FIG. 1 is a block diagram of a Doppler naviation system having simultaneous multiple modulation frequencies and variation of the basic modulation frequency.

Referring now to FIG. 1 the system in accordance with the invention will be described with respect to a Doppler navigation system of the general type disclosed in the aforementioned co-pending application, reference to which may be made for the details thereof. The system disclosed in FIG. 1 of the present application corresponds generally with those portions of the system described in FIG. 5 of the co-pending application as incorporated in the over-all block diagram of FIG. 1 thereof.

The navigation system of FIG. 1 comprises an antenna 11 adapted to be controlled by an antenna switch 12 sequentially to position a microwave transmit and receive beam at predetermined positions relative to the aircraft. These are located in quadrants to the front-left, front-right, rear-right, and rear-left of the aircraft. In a typical antenna switching arrangement of this type the antenna beam would rotate through a complete scan cycle at a rate of five cycles per second and the beam position could be achieved by electrical or mechanical means. The antenna switch 12 also applies synchronizing signals to a two-stage counter 13. The two-stage counter 13 is triggered once for each position of the antenna beam. Four unique states of the counter are produced for each antenna scan. The counter 13 controls the frequency of a 600 kc. modulation oscillator. The four states of the counter 13 produce four distinct frequency steps over a range of approximately plus and minus 3% of the 600 kc. value. This stepping of the modulation frequency may be accomplished as the multiple step modulation was accomplished in the aforementioned co-pending application or by appropriate connection from the stages of the counter 13 to diode switches which control the connection of capacitors across the tuned circuit of the oscillator 14. It has been found in the present application that four step variation in the modulation frequency are sufficient since the multiple modulation provided by this invention eliminates the problems at low altitude, and at high altitudes four steps of the basic modulation frequency are adequate. The step-varied 600 kc. frequency from oscillator 14 is doubled in a doubler 15 to provide the basic 1200 kc. modulation frequency output to the repeller of a microwave klystron in transmitter 16. This 1200 kc. modulation frequency is also applied to a quadrupler 17 for application to a receiver 18. The fourth harmonic of the modulation frequency is recovered from the antenna system after mixing with transmitter energy in the first detector associated with the antenna system. The 1200 kc. signal from doubler 15 is applied to an AFC circuit 19 which maintains the carrier frequency of the transmitter 16 constant, as disclosed in the Gunkel et al. co-pending application.

The 600 kc. signal generated by the oscillator 14 is counted down in a flip-flop 21 to produce a 300 kc. output signal and this signal is also counted down again in a flip-flop 22 to produce a 150 kc. output signal. The three modulation frequencies 1200 kc. from the doubler 15, 300 kc. from the flip-flop 21, and 150 kc. from the flip-flop 22 are all applied to an adder 23 which may be a transformer device having separate primary windings for the three inputs and a common secondary winding for the output. The adder 23 applies all three modulation frequencies to the repeller of the klystron in the transmitter 16. In conjunction with the adder circuit 23, appropriate amplitude control devices 20 such as potentiometers may be introduced in each of the modulation frequency signal lines in order that the modulation frequency amplitudes may be adjusted to the appropriate value. In general it will be desirable to adjust the amplitudes to obtain modulation indexes for the different modulation frequencies which produce equal amplitudes in the appropriate harmonic echo signal which is developed at the common frequency of the intermediate frequency amplifier of the receiver 18. Since the intermediate frequency is approximately 4.8 megacycles corresponding to the fourth harmonic of the 1200 kc. modulation frequency from doubler 15, the corresponding harmonic for the 300 kc. modulation frequency would be the 16th harmonic and the harmonic of the received signal for the 150 kc. modulation frequency would be the 32nd harmonic. Each of these return signals will be at approximately 4.8 megacycles to be amplified by the IF amplifier in the receiver 18 and demodulated in a second mixer by the 4.8 megacycles signal from the quadrupler 17 in accordance with the disclosure of the co-pending application. Signals demodulated by the receiver 18 are applied to a tracker 24 which applies Doppler equivalent frequency signals to a computer 25 which computes ground speed and drift angle to be applied to navigation computer or indicator device 26.

Since the primary need for the multiple modulation technique of FIG. 1 is at low altitudes where sensitivity of the system does not need to be optimum due to the proximity of the reflecting surface of the earth, the reduction in system sensitivity caused by the multiple modulation is not detrimental to over-all operation. At altitudes above approximately 5000 ft., however, this loss of system sensitivity may be detrimental. Since the effect of altitude holes is substantially completely eliminated by the step modulation provided by the step modulation counter 13, the multiple modulation is arranged to be selectively switched off for the higher altitude condition. For this purpose the flip-flops 21 and 22 are arranged to be controlled by an input line 27 which may be energized through an appropriate means to start or stop the modulation flip-flops 21 and 22. As shown the line 27 is connected to a switch 28 having selective connections to either an altitude switch 29 or a receiver AGC potential device 30 for automatic control of the flip-flops 21 and 22. Upon the selective connection of switch 28 to the altitude switch 29 a potential will be applied at a predetermined altitude, say of 5000 ft., to disable the flip-flops 21 and 22 thereby eliminating the production of the 300 kc. and 150 kc. signals. Under this condition the adder 23 supplies only the single step-varied modulation frequency of approximately 1200 kc. from doubler 15 to the klystron of transmitter 16.

The alternative position of switch 28 to the receiver AGC device 30 is arranged automatically to produce the additional modulation frequencies whenever an altitude hole is present and produces sufficiently severe signal loss to reduce the AGC potential. Thus for these conditions the AGC potential will switch on the 300 and 150 kc. modulation frequencies to eliminate the effect of the altitude hole whenever it occurs. The step variation in frequency of oscillator 14 continues at all altitudes and for all signal strengths since it does not interfere with the generation of multiple modulation frequencies. The system also could be arranged to operate for both conditions, i.e., multiple modulation for below 5000 ft. altitude or for low signal strength.

The effect of multiple modulation can be understood with reference to FIG. 2 which shows the distribution of altitude holes for various modulation frequencies. Thus characteristic 31 is a plot of amplitude response vs. altitude for a modulation frequency of 1200 kc. As can be seen, an altitude hole occurs in the response characteristic every 400 ft. with the first altitude hole occurring near 400 ft. altitude. Similarly, the characteristic 32 represents the amplitude response for a modulation frequency of 300 kc. and the characteristic 33 is the amplitude response for a modulation frequency of 150 kc. As can be seen, the altitude holes at all altitudes have been effectively bridged by the composite characteristic which is effectively the highest amplitude at any altitude of any of the three characteristics 31, 32 or 33. At zero altitude all of the characteristics have an altitude hole but the hole for the characteristic 31 has a sufficiently steep slope to rapidly produce a suitable amplitude signal once the aircraft is a few feet off the ground. The next common altitude hole occurs at 3200 feet at which altitude the step frequency modulation of the basic 1200 kc. FM and the antenna beam width are effective to shift the 3200 foot hole for the characteristic 31 a sufficient amount to eliminate the effect of this hole in the 1200 kc. response.

Referring now to FIG. 3 a modification of the radar systems of the invention to provide sequential multiple frequency modulation will be described. For this purpose the antenna switch 12 is adapted to control gates 38 and 39 to energize oscillators 41, 42 and 43 sequentially and pass the signals therefrom sequentially to the repeller of the klystron in the transmitter and as reference phase to the AFC loop. The oscillator 41 is selected to have a frequency relative to the oscillators 42 and 43 such that a common multiple of the frequencies will be suitable for the IF amplifier in the receiver. As shown, oscillator 41 operates at 400 kc., oscillator 42 at 300 kc., and oscillator 43 at 240 kc. The common multiple of these frequencies is 1200 kc. which for this system would be the IF frequency of the receiver. To demodulate frequencies at 1200 kc. from each of the modulation frequencies, a harmonic multiplier 44 is provided which is selective to obtain the third, fourth and fifth harmonic respectively from the energy derived from the oscillators 41, 42 and 43. Thus the receiver would operate with respect to the third harmonic of oscillator 41, the fourth harmonic of oscillator 42, and the fifth harmonic of oscillator 43, and these terms in the echo signal energy would be the ones which would be recovered.

In this system the AFC loop for the transmitter would have to be adapted to operate with each of the transmitted modulation frequencies, since in a sequential system only the single modulation frequency is present at any given time. Here again the antenna switch 12 supplies a synchronizing signal to synchronize the modulation sequence in predetermined relation to the antenna beam switching and preferably the modulation frequency would only be switched after a complete beam switch cycle has been completed. With the system of FIG. 3 the problems encountered in swinging the klystron repeller voltage over a relatively wide range by multiple modulation frequencies are avoided and the lower modulation frequencies permit the same modulation index with a lower swing of the repeller voltage. Hence, the isolation between the transmitter and receiver will be somewhat improved for these lower modulation frequencies. Since the modulation frequencies are applied sequentially, there need not be any harmonic relation between the frequencies since the possibility of beat frequencies will not occur.

In the system of FIG. 1 the modulation indexes which are chosen to obtain optimum amplitude of the J4, J16 and J32 terms are as follows: 1200 kc., 2.4; 300 kc., 9.6; 150 kc., 19.2. With these indexes the received signals from the three modulation frequencies are recovered with relatively the same strength to be processed by the receiver and subsequent portions of the system.

While a particular arrangement of multiple sequential or simultaneous modulation has been described it will be apparent that various other arrangements utilizing the present teachings can be employed to achieve the desired result. In particular, the employment of step variation of the basic modulation frequency over a few percent from the nominal value for the elimination of altitude hole effects at high altitudes and the employment of multiple modulation frequencies for the elimination of the low altitude holes permits the system in accordance with the present invention to operate with any type of flight profile and eliminates all error due to loss of signal resulting from altitude holes when the flight is conducted at low altitude or for the portions of the flight which are at low altitude due to climb and descent.

The invention is accordingly to be construed as not limited to the particular arrangement disclosed but only by the scope of the appended claims.

I claim:
1. An FM radar comprising a microwave transmitter, a first detector for detecting portions of transmitted energy reflected from distant objects, a means for generating a plurality of harmonically related modulation frequencies, means for simultaneously frequency modulating said transmitter with said modulation frequencies, a frequency multiplier for producing a demodulation frequency which is an integral multiple of the highest of said modulation frequencies, and a Doppler demodulator responsive to said demodulation frequency and signals from said first detector of the same frequency as said demodulation frequency to recover Doppler signals from all components of said modulation frequencies.

2. A Doppler navigation system comprising a transmitter frequency modulated by a plurality of harmonically related modulation frequencies, means for detecting the Doppler spectrum associated with components of all of said modulation frequencies at a particular frequency which is a higher than first order harmonic of all of said modulation frequencies, and means for cyclically varying by a few percent one of said modulation frequencies.

3. A Doppler navigation system comprising a transmitter, means for frequency modulating said transmitter simultaneously with a plurality of harmonically related modulation frequencies, means for selectively terminating modulation of said transmitter by all but one of said modulation frequencies, means for detecting the Doppler spectrum associated with components of all of said modulation frequencies at a particular frequency which is a higher than first order harmonic of all of said modulation frequencies, and means for cyclically varying said one of said modulation frequencies over a limited range.

4. Apparatus according to claim 3 and including means responsive to altitude for terminating all but said one of said modulation frequencies.

5. Apparatus according to claim 3 and including means responsive to received signal strength for terminating all but said one of said modulation frequencies.

6. A doppler navigation system comprising a transmitter, a first modulation frequency generator, means for periodically varying said first modulation frequency over a range of frequencies, means for frequency modulating said transmitter with said modulation frequency, means for generating at least one submultiple of said modulation frequency, means for modulating said transmitter with the sub-multiple frequencies generated. receiving means selectively responsive to received signals of frequency corresponding to a higher than first order harmonic of said modulation frequency and said sub-multiples thereof, and utilization means for Doppler modulation detected by said receiving means.

7. Apparatus according to claim 6 in which said modulation frequency and said sub-multiple frequencies simultaneously modulate said transmitter.

8. Apparatus according to claim 7 and including means for selectively interrupting modulation of said transmitter by said sub-multiple frequencies.

9. Apparatus according to claim 7 and including means for multiplying said modulation frequency by a factor equal to the order of said harmonic, and means for applying the multiple of said modulation frequency to said receiving means for detecting said Doppler modulation.

10. Apparatus according to claim 6 in which said sub-multiple frequencies are generated by binary counting of said modulation frequency.

References Cited by the Examiner
UNITED STATES PATENTS

| | | | |
|---|---|---|---|
| 2,522,367 | 9/50 | Guanella | 343—14 |
| 2,543,782 | 3/51 | Kiebert | 343—14 |
| 2,994,865 | 8/61 | Scism et al. | 343—9 |
| 3,013,262 | 12/61 | Follefson | 343—14 |
| 3,068,471 | 12/62 | Erst | 343—14 |
| 3,111,667 | 11/63 | Stavis | 343—14 |

CHESTER L. JUSTUS, *Primary Examiner.*